United States Patent
Luo et al.

(10) Patent No.: US 10,411,610 B2
(45) Date of Patent: Sep. 10, 2019

(54) RESONANT CONVERTER

(71) Applicant: INVENTRONICS (HANGZHOU), INC., Hangzhou, Zhejiang (CN)

(72) Inventors: Shiwei Luo, Zhejiang (CN); Delai Jiang, Zhejiang (CN)

(73) Assignee: INVENTRONICS (HANGZHOU), INC., Hangzhou, Zhejiang ( * ) Notice: Subject to any disclaimer, the term of this patent is extended or adjusted under 35 U.S.C. 154(b) by 0 days.

(21) Appl. No.: 16/317,530

(22) PCT Filed: Aug. 1, 2017

(86) PCT No.: PCT/CN2017/095369
§ 371 (c)(1),
(2) Date: Jan. 11, 2019

(87) PCT Pub. No.: WO2018/032966
PCT Pub. Date: Feb. 22, 2018

(65) Prior Publication Data
US 2019/0222130 A1    Jul. 18, 2019

(30) Foreign Application Priority Data
Aug. 17, 2016 (CN) .......................... 2016 1 0682885

(51) Int. Cl.
*H02M 3/335* (2006.01)
*H02M 1/00* (2006.01)

(52) U.S. Cl.
CPC ....... *H02M 3/33576* (2013.01); *H02M 3/335* (2013.01); *H02M 2001/0009* (2013.01); *Y02B 70/1433* (2013.01)

(58) Field of Classification Search
CPC ......... H02M 3/33569; H02M 3/33576; H02M 3/33507; H02M 3/33546;
(Continued)

(56) References Cited

U.S. PATENT DOCUMENTS

| 7,499,290 B1 * | 3/2009 | Mazzola ........... H02M 3/33569 363/17 |
| 9,083,254 B1 | 7/2015 | Clarkin et al. |

(Continued)

FOREIGN PATENT DOCUMENTS

| CN | 103518317 A | 1/2014 |
| CN | 203609698 U | 5/2014 |

(Continued)

OTHER PUBLICATIONS

International Search Report for PCT/CN2017/095369 dated Nov. 3, 2017, ISA/CN.

*Primary Examiner* — Adolf D Berhane
(74) *Attorney, Agent, or Firm* — Yue (Robert) Xu; Apex Attorneys at Law, LLP

(57) ABSTRACT

A resonant converter includes a resonant current truncating unit, a resonant current processing unit and a driving control unit. The resonant current truncating unit is connected in series in a current loop of a resonance circuit and is configured to periodically truncate to acquire a sampling interval and acquire a sampling signal characterizing a resonant current in the sampling interval. The resonant current processing unit is configured to perform an averaging process on the sampling signal to acquire a feedback signal. The driving control unit is configured to control a switching state of the main switch of the primary circuit based on the feedback signal, to make the resonant converter output a stable current.

14 Claims, 9 Drawing Sheets

(58) Field of Classification Search
CPC .......... H02M 2001/0009; H02M 3/24; H02M 3/325; H02M 3/335; H02M 1/08; H02M 1/12; H02M 1/14; H02M 1/34
See application file for complete search history.

(56) References Cited

U.S. PATENT DOCUMENTS

| | | | |
|---|---|---|---|
| 9,166,481 B1* | 10/2015 | Vinciarelli | H02M 3/33569 |
| 9,185,756 B2* | 11/2015 | Ge | H05B 33/0815 |
| 2008/0084167 A1* | 4/2008 | Waffenschnnidt | H02M 3/337 315/210 |
| 2009/0146575 A1 | 6/2009 | Chu et al. | |
| 2014/0098574 A1 | 4/2014 | Hara et al. | |
| 2014/0312789 A1* | 10/2014 | Feng | H02M 3/33507 315/186 |
| 2015/0256088 A1 | 9/2015 | Ohtake et al. | |
| 2018/0183343 A1* | 6/2018 | Ausseresse | H02M 3/33576 |

FOREIGN PATENT DOCUMENTS

| | | |
|---|---|---|
| CN | 104333148 A | 2/2015 |
| CN | 104901547 A | 9/2015 |
| CN | 105391192 A | 3/2016 |

* cited by examiner

RESONANT CONVERTER

The present application is a national phase application of PCT international patent application PCT/CN2017/095369, filed on Aug. 1, 2017 which claims priority to Chinese Patent Application No.201610682885.7, titled "RESONANT CONVERTER", filed on Aug. 17, 2016 with the Chinese Patent Office, both of which are incorporated herein by reference in their entireties.

FIELD

The present disclosure relates to the technical field of a switch-mode power supply, and in particular to a resonant converter.

BACKGROUND

Currently, a circuit structure shown in FIG. 1 is generally adopted to output a constant current or a constant voltage in the application of a resonant converter. The controlling principle of the circuit structure is as follow. An output current value Io or an output voltage value Vo of a secondary circuit is sampled, and a feedback signal is outputted to a control unit via an optical isolator. A switching frequency of a switch is controlled by the control unit according to the feedback signal, such that the resonant converter is controlled to output a constant current or a constant voltage.

In the conventional technology as shown in FIG. 1, since a controlling is performed by sampling the current value or the voltage value of the secondary circuit, the optical isolator is inevitable to isolate the secondary circuit form the control unit, thereby resulting in various components and a complicated circuit. Furthermore, the optical isolator is expensive and has a limited lifetime, which impact a lifetime of the circuit, thereby being unfavorable for applying the resonant converter.

SUMMARY

In view of this, a resonant converter is provided in the present disclosure, to solve a problem of complicated circuit and high cost due to the optical isolator in the conventional technology.

To achieve the foregoing objective, embodiments of the present disclosure provide the following technical solutions.

A resonant converter includes a resonance circuit and a control circuit. The resonance circuit includes a transformer. The resonance circuit is divided into a primary circuit and a secondary circuit with the transformer.

The control circuit includes a resonant current truncating unit, a resonant current processing unit and a driving control unit. The resonant current truncating unit is connected in series in the primary circuit and is configured to periodically truncate to acquire a sampling interval and acquire a sampling signal characterizing a resonant current in the sampling interval. The sampling interval is a predetermined continuous interval in a switching period of a main switch of the primary circuit, the resonant current is not equal to an exciting current in the sampling interval, and the sampling interval includes a time point at which the exciting current is zero.

An input end of the resonant current processing unit is connected with an output end of the resonant current truncating unit. The resonant current processing unit is configured to perform an averaging process on the sampling signal to acquire a feedback signal.

An input end of the driving control unit is connected with an output end of the resonant current processing unit. The driving control unit is configured to control a switching state of the main switch of the primary circuit based on the feedback signal, to make the resonant converter output a stable current.

Preferably, the sampling signal is a periodical signal which is directly proportional to the resonant current in the sampling interval in the switching period, and an amplitude of the sampling signal is zero in an interval rather than the sampling interval.

Preferably, the resonant current truncating unit being configured to periodically truncate to acquire a sampling interval includes: the resonant current truncating unit being configured to periodically truncate according to the switching period, to acquire the sampling interval.

Preferably, the resonant current truncating unit being configured to periodically truncate according to the switching period to acquire the sampling interval includes the resonant current truncating unit being configured to: periodically truncate each switching period according to the switching period, to acquire two sampling intervals including different time points at which the exciting current is zero; take the sampling interval corresponding to the main switches of the same set as a first sampling interval; and take the sampling interval corresponding to the main switch of another complementary turn-on set as a second sampling interval. The resonant current truncating unit being configured to acquire a sampling signal characterizing a resonant current includes the resonant current truncating unit being configured to: acquire a signal characterizing the resonant current in the first sampling interval; perform an inverse processing on the acquired signal characterizing the resonant current in the first sampling interval; acquire a signal characterizing the resonant current in the second sampling interval; superimpose the signal obtained by the inverse processing and the signal characterizing the resonant current in the second sampling interval, to acquire the sampling signal.

Preferably, the resonant current truncating unit being configured to periodically truncate according to the switching period to acquire the sampling interval includes: the resonant current truncating unit being configured to periodically truncate each switching period according to the switching period, to acquire an interval in which main switches of the same set of the primary circuit are turned on as the sampling interval.

Preferably, the resonant current truncating unit includes: a first resistor connected in series in the primary circuit; and a first switch connected in parallel with the first resistor. The first switch is turned off in the sampling interval and the first switch is turned on in an interval other than the sampling interval.

Preferably, in a case that the resonant current truncating unit is configured to periodically truncate each switching period according to the switching period to acquire an interval in which main switches of the same set of the primary circuit are turned on as the sampling interval, the resonant converter further includes an auxiliary winding. One terminal of the auxiliary winding is connected with a control end of the first switch, and the other terminal of the auxiliary winding is connected with the ground in the primary circuit. The auxiliary winding is configured to control the first switch to be turned off in the sampling interval.

Preferably, the resonant current processing unit includes an average circuit.

Preferably, the average circuit includes a second resistor and a first capacitor. One terminal of the second resistor is the input end of the resonant current processing unit, the other terminal of the second resistor is connected with one terminal of the first capacitor at a connection point being the output end of the resonant current processing unit, and the other terminal of the first capacitor is connected with the ground in the primary circuit.

Preferably, the resonant converter is an LLC resonant converter.

A resonant converter is provided in the present disclosure. A resonant current truncating unit is connected in series in a current loop of the resonant circuit and is configured to periodically truncate to acquire a sampling interval and acquire a sampling signal characterizing a resonant current in the sampling interval. A resonant current processing unit is configured to perform an averaging process on the sampling signal to acquire a feedback signal. A driving control unit is configured to control a switching state of the main switch of the primary circuit based on the feedback signal, to make a secondary winding of a transformer output a stable current via a secondary rectifying unit and an output filtering capacitor, thereby controlling the secondary circuit to output the stable current by sampling the resonant current. The optical isolator in the conventional technology is not required, thereby avoiding a problem of high cost and short lifetime of the circuit due to the optical isolator in the circuit. In addition, the circuit structure in the disclosure is simple.

DETAILED DESCRIPTION OF THE EMBODIMENTS

In order to understand the present disclosure, preferred embodiments of the present disclosure are described by way of examples. Those descriptions are only for further describing the characteristics and advantages of the present disclosure, but not limiting the claims of the present disclosure.

A resonant converter is provided in the present disclosure to solve the problem of high cost and short lifetime of the circuit due to the optical isolator in the conventional technology. The resonant converter has various types such as an LLC resonant converter and an LCC resonant converter. In the present disclosure, the LLC resonant converter is taken as an example.

Figure 1:
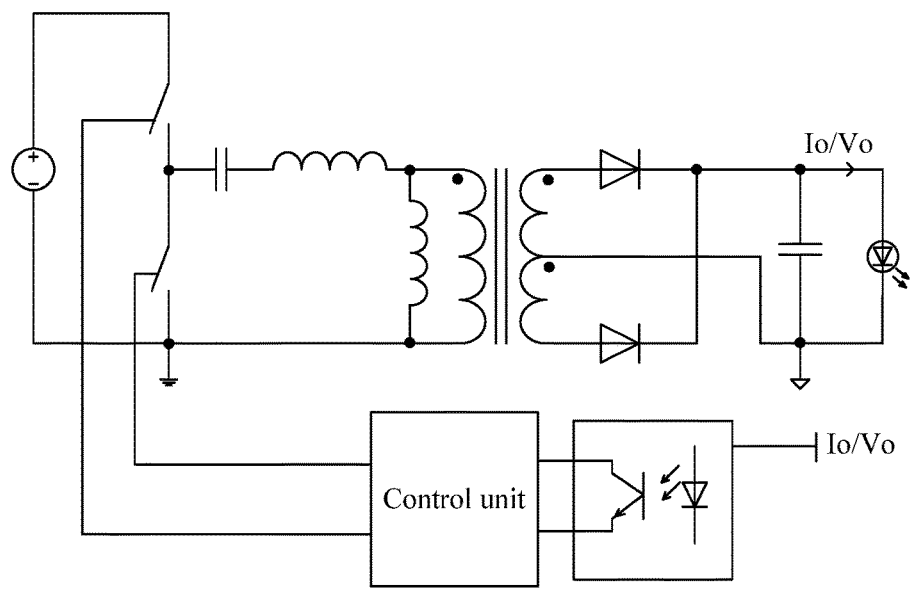
FIG. 1 is a schematic structural diagram of a resonant converter provided in the conventional technology.
Figure 2:
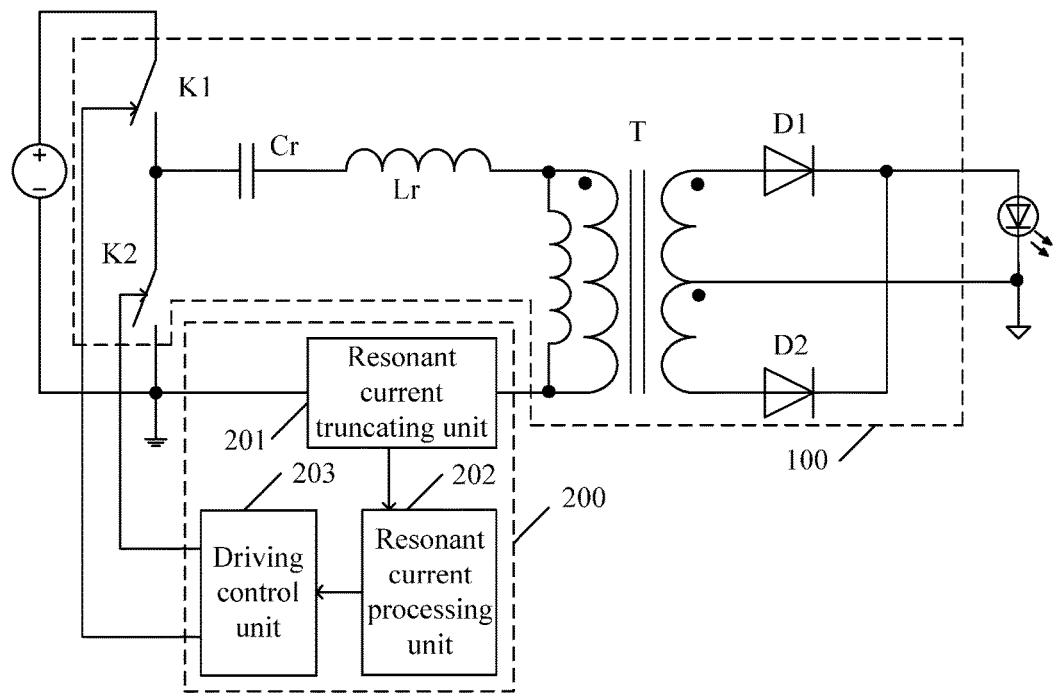
FIG. 2 is a schematic structural diagram of a resonant converter according to an embodiment of the present disclosure.

Specifically, as shown in FIG. 2, the resonant converter is the LLC resonant converter. The resonant converter includes a resonance circuit 100 and a control circuit 200. The resonance circuit 100 includes a transformer T which divides the resonance circuit 100 into a primary circuit and a secondary circuit. The control circuit 200 includes a resonant current truncating unit 201, a resonant current processing unit 202 and a driving control unit 203. The resonant current truncating unit 201 is connected in series in the primary circuit. An input end of the resonant current processing unit 202 is connected with an output end of the resonant current truncating unit 201. An input end of the driving control unit 203 is connected with an output end of the resonant current processing unit 202. An output end of the driving control unit 203 is connected with a control end of a main switch of the primary circuit.

The specific operation principle of the resonant converter is described as follows. The resonant current truncating unit 201 is configured to periodically truncate to acquire a sampling interval and acquire a sampling signal characterizing a resonant current in the sampling interval. Each sampling interval is a predetermined continuous interval in a switching period of a main switch of the primary circuit, the resonant current is not equal to an exciting current in the sampling interval, and the sampling interval includes a time point at which the exciting current is zero. The resonant current processing unit 202 is configured to perform an averaging process on the sampling signal to acquire a feedback signal. The driving control unit 203 is configured to control a switching state of the main switch of the primary circuit based on the feedback signal, to make the resonant converter output a stable current.

An objective, in which the resonant converter provided in the present disclosure controls the secondary circuit to output a stable current by sampling the resonant current, can be achieved by the foregoing operation principle. The optical isolator in the conventional technology is not required, thereby avoiding a problem of high cost and short lifetime of the circuit due to the optical isolator in the circuit in the conventional technology. In addition, the circuit structure in the disclosure is simple.

A specific embodiment of the present disclosure is described as follows. In the resonant converter, a main switch of the primary circuit includes two switches K1 and K2. The switches K1 and K2 form a half-bridge circuit. The secondary circuit includes a half-bridge rectifying circuit formed by two diodes D1 and D2. It is assumed that a resonant frequency between a resonant capacitor Cr and a resonant inductor Lr of the primary circuit is fo, a resonant frequency among the resonant capacitor Cr, the resonant inductor Lr and a excitation inductor Lm of the primary circuit is fr, a switching frequency of the main switch of the primary circuit is fs. According to a magnitude of the switching frequency fs, there are three operation modes of the resonant converter, namely fr<fs<fo, fs>fo and fs=fo.

Figure 3:
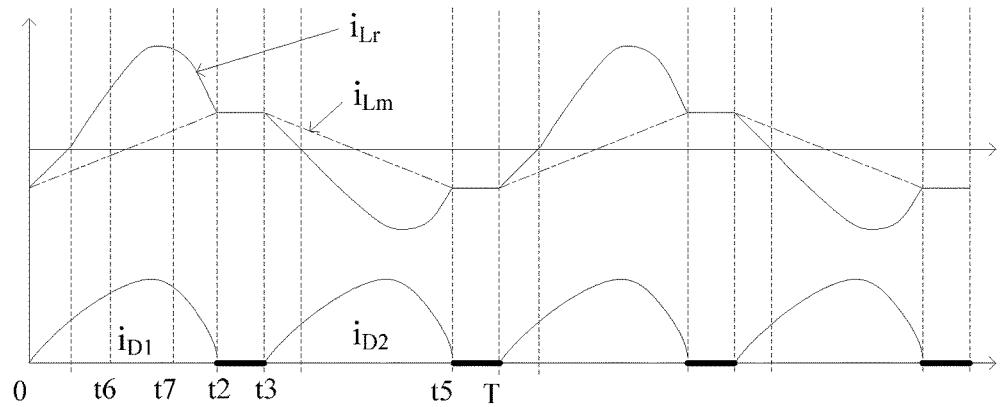
FIG. 3 is a signal waveform diagram according to an embodiment of the present disclosure.
Figure 4:
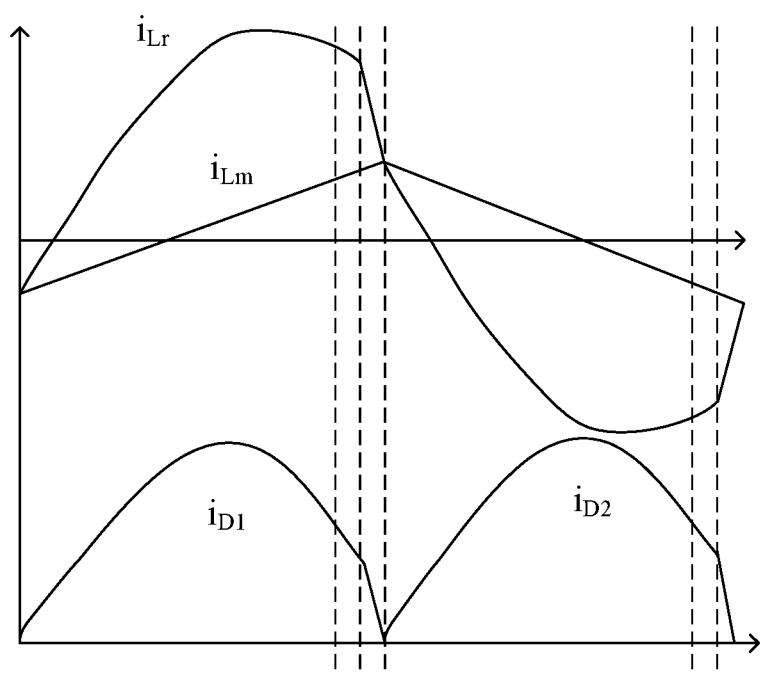
FIG. 4 is another signal waveform diagram according to an embodiment of the present disclosure.
Figure 5:
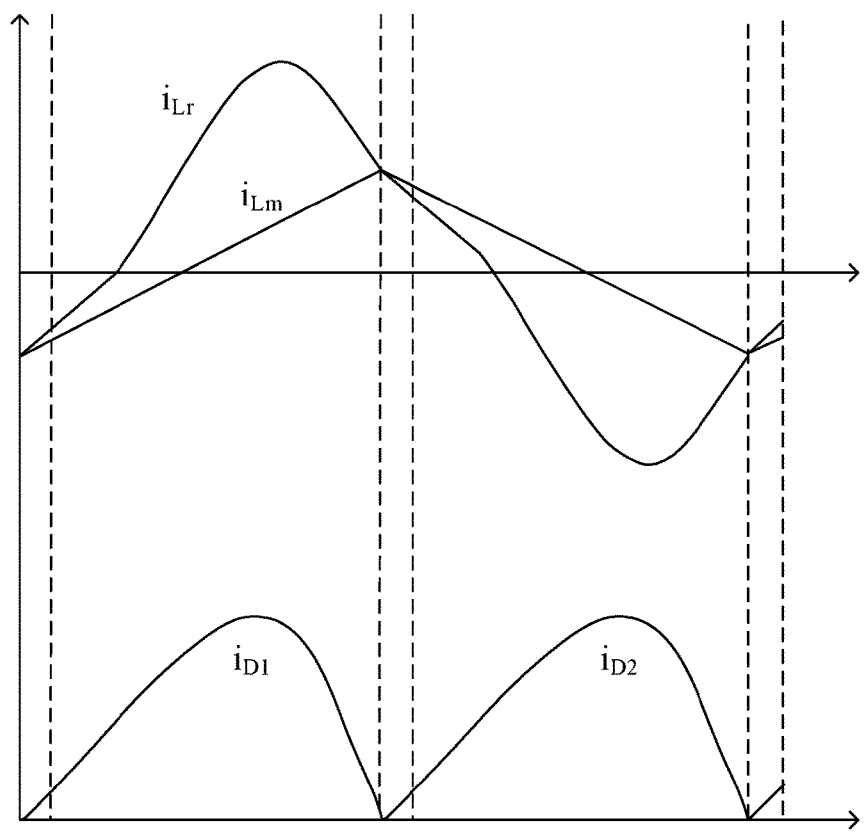
FIG. 5 is another signal waveform diagram according to an embodiment of the present disclosure.

Waveforms of a resonant current $i_{Lr}$, an exciting current $i_{Lm}$ and currents $i_{D1}$ and $i_{D2}$ of the diodes of the secondary circuit under above three operation modes are shown in FIG. 3 (the operation mode fr<fs<fo), FIG. 4 (the operation mode fs>fo) and FIG. 5 (the operation mode fs=fo).

In the operation mode fr<fs<fo shown in FIG. 3, compared with other two operation modes, the operating is more complicated due to a dead time at which the exciting current $i_{Lm}$ is equal to the resonant current $i_{Lr}$. Some details that are implemented in this operation mode can be more easily implemented in other two operation modes. The operation mode fr<fs<fo shown in FIG. 3 is taken as an example to describe.

Currents $i_{D1}$ and $i_{D2}$ of the diodes of the secondary circuit supply electric power to an electrical load. As shown in FIGS. 3 to 5, a waveform of a difference between the exciting current $i_{Lm}$ and the resonant current $i_{Lr}$ is similar to waveforms of the currents $i_{D1}$ and $i_{D2}$, and a difference between the exciting current $i_{Lm}$ and the resonant current $i_{Lr}$ is positively correlated with the currents $i_{D1}$ and $i_{D2}$. The difference between the exciting current $i_{Lm}$ and the resonant current $i_{Lr}$ is acquired by sampling, to control the resonant converter to output a stable current.

The resonant current truncating unit 201 is configured to periodically truncate to acquire a sampling interval and acquire a sampling signal characterizing a resonant current in the sampling interval. Referring to FIG. 3, a switching period (0-T) of a main switch of the primary circuit may be truncated to acquire any continuous interval in which the resonant current $i_{Lr}$ is not equal to the exciting current $i_{Lm}$, for example 0-t2, t3-t5 and t6-t7, as the sampling interval. The selected continuous interval is used as a predetermined continuous interval, that is, the sampling interval. For the operation mode fs>fo shown in FIG. 4 and the operation mode fs=fo shown in FIG. 5, there is no interval in which the resonant current $i_{Lr}$ is equal to the exciting current $i_{Lm}$. For the sampling interval of the operation modes shown in FIGS. 4 and 5, except for the endpoints of the sampling interval, the sampling interval does not include a time point at which the resonant current $i_{Lr}$ is equal to the exciting current $i_{Lm}$, that is, the sampling interval is a continuous interval in which the resonant current $i_{Lr}$ is not equal to the exciting current $i_{Lm}$, which is not repeated herein.

Preferably, the sampling signal is a periodical signal which is directly proportional to the resonant current $i_{Lr}$ in the sampling interval in the switching period, and an amplitude of the sampling signal is zero in an interval rather than the sampling interval.

Figure 6:
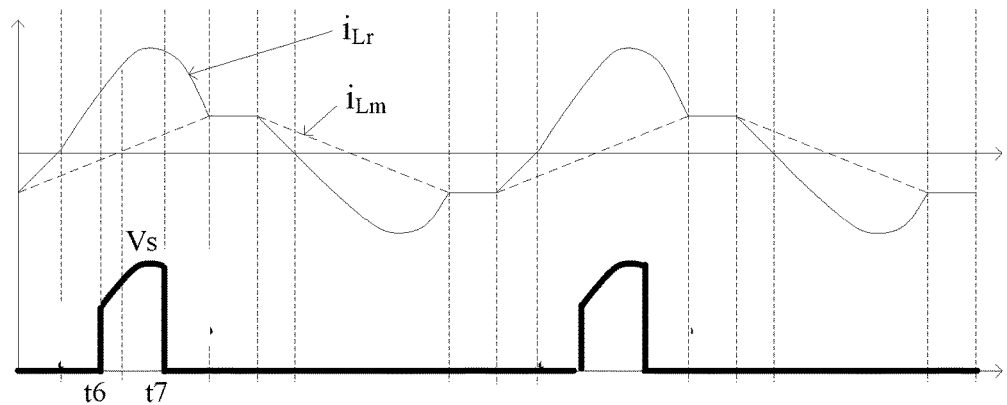
FIG. 6 is another signal waveform diagram according to an embodiment of the present disclosure.

Referring to FIG. 6, an interval t6-t7 is acquired as the sampling interval. A sampling signal Vs acquired by the resonant current truncating unit 201 characterizes the resonant current $i_{Lr}$ and is directly proportional to the resonant current $i_{Lr}$ only in the sampling interval t6-t7 and is zero in an interval other than the sampling interval t6-t7.

Preferably, the resonant current truncating unit 201 being configured to periodically truncate to acquire a sampling interval includes: the resonant current truncating unit being configured to periodically truncate according to the switching period, to acquire the sampling interval.

A difference between the resonant current $i_{Lr}$ and the exciting current $i_{Lm}$ is directly proportional to a current of the secondary winding, i.e., $i_{Lr}=i_{Lm}+n \times i_{D1}$ or $i_{Lr}=i_{Lm}+n \times i_{D2}$, where n is determined by a turns ratio of the primary winding and the secondary winding of the transformer T. In a case that an average of the exciting current $i_{Lm}$ is zero in an interval, an average of the resonant current $i_{Lr}$ is directly proportional to an average of the current $i_{D1}$ or $i_{D2}$. Furthermore, since a secondary current Id and the current $i_{D1}$ or $i_{D2}$ have a relationship of $Id=2i_{D1}=2i_{D2}$, the average of the resonant current $i_{Lr}$ acquired by such method is proportional to the secondary current Id. An average of the secondary current Id is indirectly controlled by controlling the average of the resonant current, such that the control is performed based on the primary current.

A signal proportional to the secondary current Id cannot be acquired by sampling the resonant current $i_{Lr}$ and acquiring the average of the resonant current $i_{Lr}$ due to the average of the resonant current $i_{Lr}$ in the switching period is zero. The exciting current $i_{Lm}$ cannot be acquired by sampling. Thus a difference between the resonant current $i_{Lr}$ and the exciting current $i_{Lm}$ cannot be acquired by sampling and processing.

In the conventional technology, a signal characterizing the secondary current is acquired by rectifying the sampled resonant current. Because the exciting current is not eliminated in a resonant current obtained by rectifying the sampled resonant current, a large error exists between the secondary current and the resonant current obtained by rectifying the sampled resonant current. The secondary current cannot be characterized accurately by the resonant current obtained by rectifying the sampled resonant current.

In this application, a sampling interval is acquired. In a predetermined sampling interval, the resonant current is sampled and the sampled signal is averaged. Because a time point at which the exciting current is zero is included in the sampling interval, the average of the exciting current is very small in the sampling interval (if the time point at which the exciting current is zero is a midpoint of the sampling interval, the average of the resonant current is proportional to the secondary current). Most of the exciting current can be eliminated during averaging the resonant current.

In the continuous interval in which the resonant current is equal to the exciting current, an amplitude of the exciting current is approximately constant. The average of the exciting current cannot be zero in such interval. Therefore, the sampling interval of the present disclosure is a continuous interval in which the resonant current is not equal to the exciting current, so that the acquired signal is more accurate.

In a case that the average of the exciting current $i_{Lm}$ is zero in the sampling interval, the process of controlling the secondary circuit to output a table current by sampling the resonant current $i_{Lr}$ of the primary current is most accurate.

Figure 7:
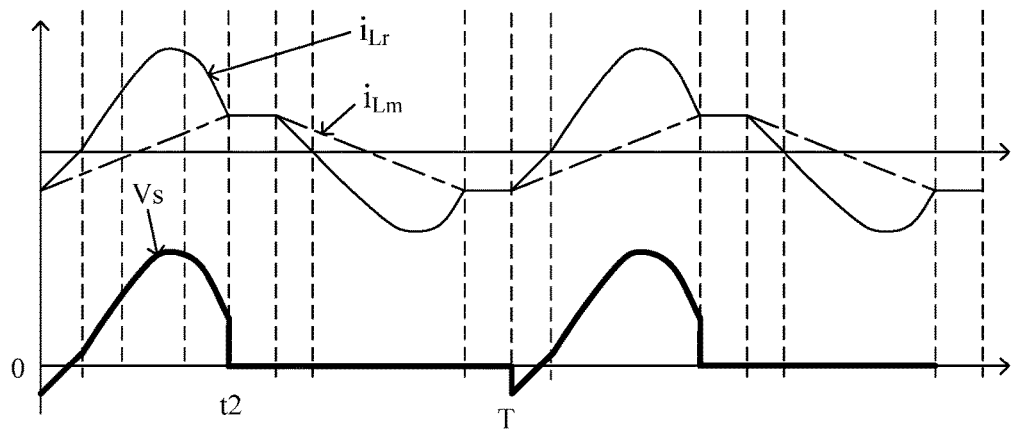
FIG. 7 is another signal waveform diagram according to an embodiment of the present disclosure.

In a case that the sampling interval includes a time point at which the exciting current $i_{Lm}$ is zero, the average of the exciting current $i_{Lm}$ is relatively smaller and the accuracy of the above process is higher. Referring to FIG. 7, an interval 0-t2 is acquired as the sampling interval. The sampling signal Vs acquired by the resonant current truncating unit 201 is shown in FIG. 7.

Preferably, the resonant current truncating unit 201 being configured to periodically truncate according to the switching period, to acquire the sampling interval includes the resonant current truncating unit being configured to: periodically truncate each switching period according to the switching period, to acquire two sampling intervals including different time points at which the exciting current is zero; take the sampling interval corresponding to the main switches of the same set as a first sampling interval; and take the sampling interval corresponding to the main switch of another complementary turn-on set as a second sampling interval. The resonant current truncating unit 201 being configured to acquire a sampling signal characterizing a resonant current includes the resonant current truncating unit being configured to: acquire a signal characterizing the resonant current in the first sampling interval; perform an inverse processing on the acquired signal characterizing the resonant current in the first sampling interval; acquire a signal characterizing the resonant current in the second sampling interval; superimpose the signal obtained by the inverse processing and the signal characterizing the resonant current in the second sampling interval, to acquire the sampling signal.

Figure 8:
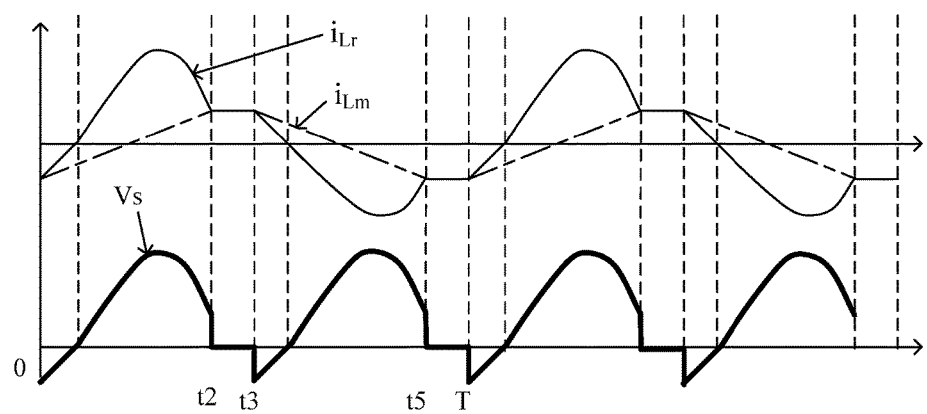
FIG. 8 is another signal waveform diagram according to an embodiment of the present disclosure.

For example, reference is made to FIG. 8, the resonant current truncating unit 201 periodically truncates each switching period according to the switching period, to acquire two sampling intervals including different time points at which the exciting current is zero. The sampling signal Vs is obtained by superimposing a signal directly proportional to the resonant current in a sampling interval (0-t2) and a signal acquired by performing an inverse processing on a signal directly proportional to the resonant current in another sampling interval (t3-t5). In the switching period (0-T), the sampling signal Vs is zero in an interval other than the above two sampling intervals.

Alternatively, the resonant current truncating unit 201 being configured to periodically truncate according to the switching period, to acquire the sampling interval includes: the resonant current truncating unit being configured to periodically truncate each switching period according to the switching period, to acquire an interval in which main switches of the same set of the primary circuit are turned on as the sampling interval.

In an specific application, in a case that the primary circuit is a half-bridge LLC circuit, the sampling interval, acquired by the resonant current truncating unit 201 truncates the switching period, is an interval in which a main switch of the primary circuit is turned on. In a case that the primary circuit is a full-bridge LLC circuit, the sampling interval, acquired by the resonant current truncating unit 201 truncates the switching period, is an interval in which main switches of the same set of the primary circuit are turned on, that is, an interval in which a pair of main switches with the same switching state are turned on.

For example, reference is made to FIG. 7, the resonant current truncating unit 201, according to the switching period, periodically truncates each switching period to acquire a sampling interval (the interval 0-t2 is taken as an example to illustrate). Each of the sampling intervals shown in FIGS. 7 and 8 includes a time point at which the exciting current $i_{Lm}$ is zero.

Two manners for performing truncation to acquire the sampling interval are shown in FIGS. 7 and 8 respectively. Each of the manners is a preferred embodiment, but it is not intend to limit the disclosure. The sampling interval should not include an interval in which the resonant current $i_{Lr}$ is equal to the exciting current $i_{Lm}$, the sampling interval may include a time point at which the resonant current $i_{Lr}$ is equal to the exciting current $i_{Lm}$, such as the time point t2 shown in FIG. 7 or 8, which may be determined according to specific applications, the sampling interval meeting the above condition fall within the scope of the present disclosure.

It can be seen from the above content that, the currents $i_{D1}$ and $i_{D2}$ has a similar waveform as the signal characterizing the resonant current $i_{Lr}$ in the sampling interval, and the currents $i_{D1}$ and $i_{D2}$ are positively correlated with the signal characterizing the resonant current $i_{Lr}$ in the sampling interval. Therefore, in the same sampling interval, the average of the resonant current $i_{Lr}$ is positively correlated with the average of current $i_{D1}$ or $i_{D2}$, that is, the average of the resonant current $i_{Lr}$ increases with the increasing of the average of current $i_{D1}$ or $i_{D2}$.

A resonant converter is provided according to another embodiment of the present disclosure, as shown in FIG. 2, the resonant converter includes a resonance circuit 100 and a control circuit 200. The resonance circuit 100 includes a transformer T, the transformer T divides the resonance circuit 100 into a primary circuit and a secondary circuit. The control circuit 200 includes a resonant current truncating unit 201, a resonant current processing unit 202 and a driving control unit 203.

Preferably, based on the above embodiment, the resonant current truncating unit 201 includes a first resistor and a first switch. The first resistor is connected in series in the primary circuit. The first switch and the first resistor are connected in parallel.

A voltage across the first resistor is directly proportional to the resonant current. The voltage across the first resistor is an output signal of the resonant current truncating unit 201.

Figure 9:
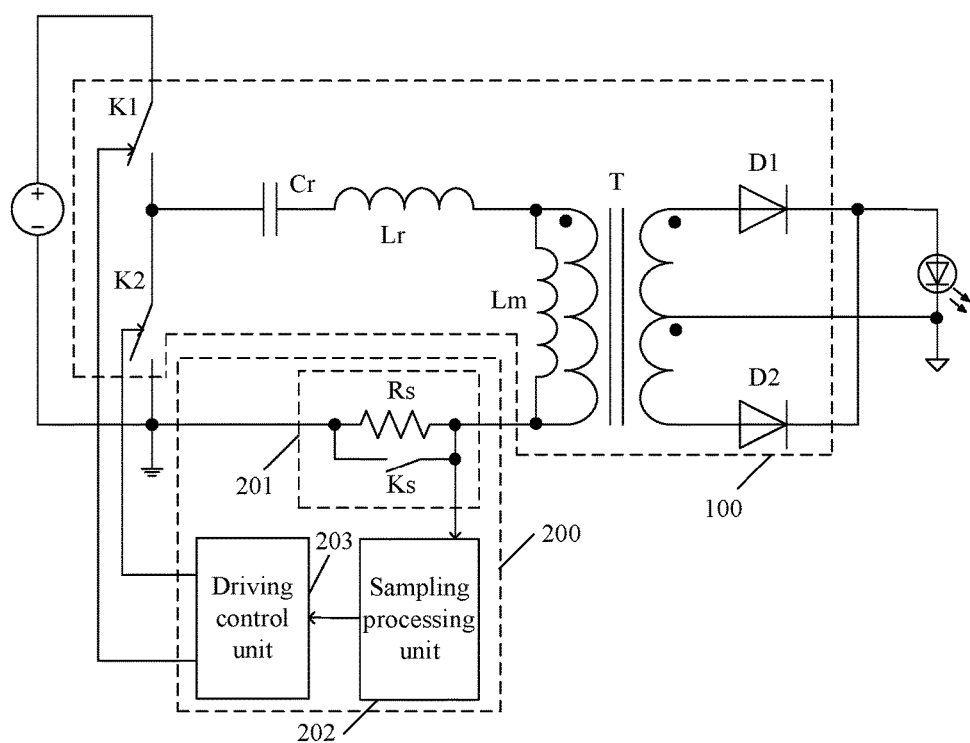
FIG. 9 is a schematic structural diagram of another resonant converter according to an embodiment of the present disclosure.

For example, reference is made to FIG. 9, one terminal of a first resistor Rs of the resonant current truncating unit 201 is connected with a non-dotted terminal of the primary winding of the transformer T. The other terminal of the first resistor Rs is connected with a negative electrode of the power supply, i.e. the ground in the primary circuit. A voltage value of a connection point at which the one terminal of the first resistor Rs is connected with the non-dotted terminal of the primary winding of the transformer T is a voltage across the first resistor. The connection point is an output end of the resonant current truncating unit 201.

The first switch Ks is used for truncating to acquire the sampling interval, and the first resistor Rs is used for acquiring the sampling signal characterizing the resonant current in the sampling interval. Specifically, the first switch Ks is turned off during the sampling interval and is turned on during an interval other than the sampling interval. In a case the first switch Ks is turned on, the first resistor Rs is shorted. In the switching period, the sampling signal is directly proportional to the resonant current in the sampling interval, and is zero in an interval other than the sampling interval.

In the specific application, the first resistor may be connected in series in the primary circuit at any suitable position, as long as the resonant current can be sampled, these solutions fall within the scope of the present disclosure.

Preferably, in a case that the resonant current truncating unit 201 is configured to periodically truncate each switching period according to the switching period to acquire an interval in which main switches of the same set of the primary circuit are turned on as the sampling interval, the resonant converter further includes an auxiliary winding. One terminal of the auxiliary winding is connected with a control end of the first switch, and the other terminal of the auxiliary winding is connected with the ground in the primary circuit. The auxiliary winding is configured to control a switching state of the first switch. In an embodiment, the auxiliary winding is configured to control the first switch to be turned off in the sampling interval.

Figure 10:
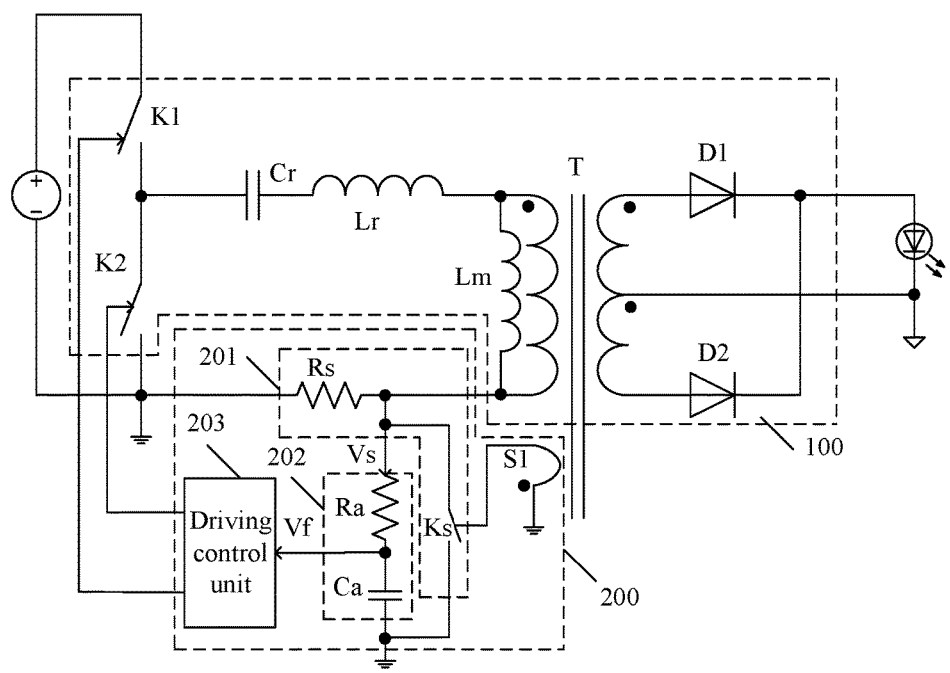
FIG. 10 is a schematic structural diagram of another resonant converter according to an embodiment of the present disclosure.

For example, referring to FIG. 10, based on the example shown in FIG. 9, the resonant converter further includes an auxiliary winding S1. A dotted terminal of the auxiliary winding S1 is connected with the ground in the primary circuit. A non-dotted terminal of the auxiliary winding S1 is connected with the control end of the first switch Ks.

The sampling signal Vs shown in FIG. 7 may be acquired by generating a drive signal for the first switch Ks by using the auxiliary winding S1. Specifically, referring to FIG. 7, in the sampling interval 0-t2, the exciting current $i_{Lm}$ changes from a minimum value to a maximum value, and an average of the exciting current $i_{Lm}$ is zero. In this interval, the rectifying diode D1 of the secondary circuit is turned on. A voltage at the dotted terminal of the transformer T is positive. A voltage at the non-dotted terminal of the auxiliary winding S1 is negative. The auxiliary winding S1 does not drive a drive voltage of the first switch Ks. The first switch Ks is turned off. The resonant current $i_{Lr}$ flows through the first resistor Rs. The signal characterizing the resonant current $i_{Lr}$ in the sampling signal Vs is acquired by the first resistor Rs.

In the interval t2-T, a voltage at the non-dotted terminal of the auxiliary winding S1 is positive, the first switch Ks is turned on, the first resistor Rs is shorted. The resonant current $i_{Lr}$ flows to the ground in the primary circuit through the first switch Ks, the resonant current $i_{Lr}$ cannot be sampled by the first resistor Rs. Therefore, the sampling signal Vs in this interval is zero.

Preferably, referring to FIG. 10, the resonant current processing unit 202 includes an average circuit.

Preferably, referring to FIG. 10, the average circuit includes a second resistor Ra and a first capacitor Ca. One terminal of the second resistor Ra is the input end of the resonant current processing unit 202. The other terminal of the second resistor Ra is connected with one terminal of the first capacitor Ca at a connection point being the output end of the resonant current processing unit 202. The other terminal of the first capacitor Ca is connected with the ground in the primary circuit.

The average circuit processes the sampling signal Vs. A signal obtained by averaging the sampling signal Vs is used a feedback signal Vf, and the feedback signal is outputted to the driving control unit 203. Referring to FIG. 10, the feedback signal Vf is an average of the sampling signal Vs during one switching period.

Figure 11:
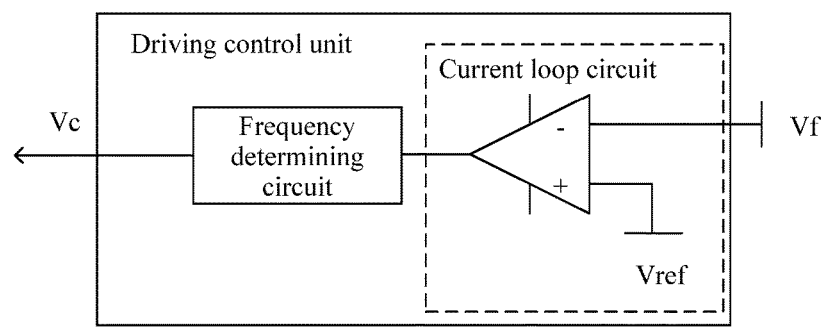
FIG. 11 is a schematic structural diagram of a driving control unit according to an embodiment of the present disclosure.

Referring to FIG. 11, the driving control unit includes a current loop circuit and a frequency determining circuit, the current loop circuit includes an operational amplifier. An inverting input terminal of the operational amplifier is an input end of the driving control unit and receives the feedback signal Vf. A non-inverting input terminal of the operational amplifier receives a current loop reference signal Vref. An output terminal of the operational amplifier is connected with an input end of the frequency determining circuit. An output end of the frequency determining circuit is the output end of the driving control unit and is connected with a control end of the main switch of the primary circuit. The frequency determining circuit is configured to output the control signal Vc. A switching frequency of the main switch of the primary circuit is controlled based on the control signal Vc to increase with the increasing of the feedback signal and to decrease with the decreasing of the feedback signal.

In a case that the resonant converter outputs a large current due to some reasons, the feedback signal Vf is correspondingly large. A comparison result between the feedback signal Vf and the current loop reference signal Vref of is inputted to the frequency determining circuit. The frequency determining circuit determines a driving frequency of the control signal Vc according to an output signal of the operational amplifier. If the feedback signal Vf is increased, as a result, the driving frequency of the control signal Vc is increased, and the switching frequency of the main switch of the primary circuit is increased. If the feedback signal Vf is decreased, as a result, the driving frequency of the control signal Vc is decreased, and the switching frequency of the main switch of the primary circuit is decreased. The driving control unit 203 receives the feedback signal Vf and changes the driving frequency of the control signal Vc and adjusts the switching frequency of the main switch of the primary circuit according to the feedback signal Vf, so that the output current of the resonant converter is stable.

It should be noted that, in practice, an excitation inductor of the transformer T is an excitation inductor (for example, Lm shown in FIG. 9 or 10) of the resonant converter. Alternatively, the resonant converter further includes a first inductor (for example, Lm shown in FIG. 9 or 10). Two terminals of the first inductor are connected with two terminals of the primary winding of the transformer T respectively.

In addition, all known rectifying methods may be adopted in the secondary circuit according to actual requirements.

Above implementations of the circuit fall within the scope of the present disclosure, which are not limited here and may be determined according to the specific application environment.

The optical isolator in the conventional technology is not required in the resonant converter according to the present disclosure, thereby avoiding a problem of high cost and short lifetime of the circuit due to the optical isolator in the circuit in the conventional technology. The reliability is enhanced and the circuit structure is simple with fewer components.

The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method.

Preferred embodiments of the disclosure are described above, so that a person skilled in the art can implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

The invention claimed is:

1. A resonant converter, comprising:
   a resonance circuit comprising a transformer, wherein the resonance circuit is divided into a primary circuit and a secondary circuit with the transformer; and
   a control circuit comprising:
     a resonant current truncating unit, wherein the resonant current truncating unit is connected in series in the primary circuit and is configured to periodically truncate to acquire a sampling interval and acquire a sampling signal characterizing a resonant current in the sampling interval, wherein the sampling interval is a predetermined continuous interval in a switching period of a main switch of the primary circuit, the resonant current is not equal to an exciting current in the sampling interval, and the sampling interval comprises a time point at which the exciting current is zero;
     a resonant current processing unit, wherein an input end of the resonant current processing unit is connected with an output end of the resonant current truncating unit, wherein the resonant current processing unit is configured to perform an averaging process on the sampling signal to acquire a feedback signal; and a driving control unit, wherein an input end of the driving control unit is connected with an output end of the resonant current processing unit, wherein the driving control unit is configured to control a switching state of the main switch of the primary circuit based on the feedback signal, to make the resonant converter output a stable current.

2. The resonant converter according to claim 1, wherein the sampling signal is a periodical signal which is directly proportional to the resonant current in the sampling interval in the switching period, and an amplitude of the sampling signal is zero in an interval rather than the sampling interval.

3. The resonant converter according to claim 1, wherein the resonant current truncating unit being configured to periodically truncate to acquire a sampling interval comprises:

the resonant current truncating unit being configured to periodically truncate according to the switching period, to acquire the sampling interval.

4. The resonant converter according to claim 3, wherein the resonant current truncating unit being configured to periodically truncate according to the switching period, to acquire the sampling interval comprises:

the resonant current truncating unit being configured to:
periodically truncate each switching period according to the switching period, to acquire two sampling intervals comprising different time points at which the exciting current is zero; take the sampling interval corresponding to the main switches of the same set as a first sampling interval; and take the sampling interval corresponding to the main switch of another complementary turn-on set as a second sampling interval; and the resonant current truncating unit being configured to acquire a sampling signal characterizing a resonant current comprises:
the resonant current truncating unit being configured to:
acquire a signal characterizing the resonant current in the first sampling interval; perform an inverse processing on the acquired signal characterizing the resonant current in the first sampling interval; acquire a signal characterizing the resonant current in the second sampling interval; superimpose the signal obtained by the inverse processing and the signal characterizing the resonant current in the second sampling interval, to acquire the sampling signal.

5. The resonant converter according to claim 3, wherein the resonant current truncating unit being configured to periodically truncate according to the switching period, to acquire the sampling interval comprises:

the resonant current truncating unit being configured to periodically truncate each switching period according to the switching period, to acquire an interval in which main switches of the same set of the primary circuit are turned on as the sampling interval.

6. The resonant converter according to claim 1, wherein the resonant current truncating unit comprises:

a first resistor connected in series in the primary circuit; and a first switch connected in parallel with the first resistor, wherein the first switch is turned off in the sampling interval and the first switch is turned on in an interval other than the sampling interval.

7. The resonant converter according to claim 6, wherein in a case that the resonant current truncating unit is configured to periodically truncate each switching period according to the switching period to acquire an interval in which main switches of the same set of the primary circuit are turned on as the sampling interval, the resonant converter further comprises:

an auxiliary winding, wherein one terminal of the auxiliary winding is connected with a control end of the first switch, and the other terminal of the auxiliary winding is connected with the ground in the primary circuit; wherein the auxiliary winding is configured to control the first switch to be turned off in the sampling interval.

8. The resonant converter according to claim 7, wherein the resonant current processing unit comprises an average circuit.

9. The resonant converter according to claim 8, wherein the average circuit comprises a second resistor and a first capacitor; wherein one terminal of the second resistor is the input end of the resonant current processing unit, the other terminal of the second resistor is connected with one terminal of the first capacitor at a connection point being the output end of the resonant current processing unit, and the other terminal of the first capacitor is connected with the ground in the primary circuit.

10. The resonant converter according to claim 9, wherein the resonant converter is an LLC resonant converter.

11. The resonant converter according to claim 2, wherein the resonant current truncating unit comprises:

a first resistor connected in series in the primary circuit; and a first switch connected in parallel with the first resistor, wherein the first switch is turned off in the sampling interval and the first switch is turned on in an interval other than the sampling interval.

12. The resonant converter according to claim 3, wherein the resonant current truncating unit comprises:

a first resistor connected in series in the primary circuit; and a first switch connected in parallel with the first resistor, wherein the first switch is turned off in the sampling interval and the first switch is turned on in an interval other than the sampling interval.

13. The resonant converter according to claim 4, wherein the resonant current truncating unit comprises:

a first resistor connected in series in the primary circuit; and a first switch connected in parallel with the first resistor, wherein the first switch is turned off in the sampling interval and the first switch is turned on in an interval other than the sampling interval.

14. The resonant converter according to claim 5, wherein the resonant current truncating unit comprises:

a first resistor connected in series in the primary circuit; and a first switch connected in parallel with the first resistor, wherein the first switch is turned off in the sampling interval and the first switch is turned on in an interval other than the sampling interval.

* * * * *